Patented June 24, 1952

UNITED STATES PATENT OFFICE 2,601,408

TWO-STEP DIGESTION OF WOOD WITH ALIPHATIC ACID

Mervin E. Martin, Cumberland, and Daniel L. Sherk, La Vale, Md., assignors to Celanese Corporation of America, a corporation of Delaware No Drawing. Application August 29, 1947, Serial No. 771,390

5 Claims. (Cl. 92—9)

This invention relates to the treatment of wood and relates more particularly to an improved process for the production of purified wood pulp cellulose adapted to be employed in the preparation of cellulose derivatives, such as organic acid esters of cellulose or cellulose ethers, by subjecting said purified cellulose to suitable esterification or etherification processes.

An object of this invention is to provide an improved process for the treatment of wood in the production of purified wood pulp cellulose suitable for conversion into cellulose derivatives of high clarity and free from color.

Other objects of this invention will appear from the following detailed description.

Wood pulp cellulose may be obtained from wood particles by various chemical treatments. The treatments employed usually involve digesting the wood particles with chemical agents which act to break down the structure of the wood particles and convert the same into a pulp. The lignin, pentosans and other non-cellulosic materials are separated therefrom, usually by a series of alkali and chlorination treatments and the purified wood pulp cellulose may then be converted into the desired cellulose derivatives.

We have now found that purified wood pulp cellulose may be obtained with little or no further alkali or chlorination treatment if wood particles are subjected to a plurality of digestions with an aqueous solution of a lower aliphatic acid, the initial digestion being effected with a relatively high concentration of said lower aliphatic acid and the remaining digestion or digestions being effected with an aqueous lower aliphatic acid solution of the same or of a lower acid concentration. Improved yields of purified cellulose are obtained, we have further found, if the aqueous lower aliphatic acid solution employed for said digestions contains a catalyst to aid the digestion such as, for example, phosphoric acid, in an amount of 0.5 to 1.0% on the weight of the wood being digested.

Thus, in accordance with our novel process, we subject wood in finely divided particle form to digestion for 5 to 60 minutes under pressure at a temperature of 150 to 160° C. with 6 to 8 parts on the weight of the wood of a 50 to 70% aqueous solution of acetic acid containing 0.5 to 1.0% phosphoric acid on the weight of the wood as a catalyst, and, following this initial treatment, subjecting the partly digested wood particles to at least one additional digestion for 5 to 60 minutes under pressure at a temperature of 150 to 160° C. with 6 to 8 parts on the weight of the wood originally employed of, preferably, a 30 to 40% aqueous solution of acetic acid containing 0.5 to 1.0% of phosphoric acid on the weight of the wood. The additional digestions also may be effected, however, with up to 70% aqueous acetic acid solutions. All of the percentages given are figured on a weight basis. Our novel process produces wood pulp cellulose of substantially decreased lignin and pentosan content. Yields of purified cellulose of 46 to 56% based on the weight of the wood originally employed are obtained. After washing with water, the purified cellulose obtained may then be employed directly for the preparation of cellulose derivatives.

A further purification involving alkali, chlorination and bleaching treatments may be employed where a greater reduction in the lignin or pentosan content than that achieved by digestion is necessary or desirable.

Other lower aliphatic acids, such as, for example, propionic or butyric acid, or mixtures of said acids with or without acetic acid may also be employed for said digestion.

In order further to illustrate our invention but without being limited thereto, the following examples are given:

Example I

To 100 parts by weight of white birch chips are added 700 parts by weight of 70% aqueous acetic acid and 0.5 part by weight of phosphoric acid and the mixture digested under pressure at 160° C. for one hour. The acetic acid is drained from the chips and replaced with enough fresh 70% aqueous acetic acid containing 0.5 part by weight of phosphoric acid to equal the original amount and digested again at 160° C. for one hour and the treatment repeated a third time. The digested pulp is then separated from the liquid and washed. A yield of 51.7% of wood pulp is obtained based on the weight of the wood originally employed. The wood pulp contains 1.85% of lignin and 4.75% of combined acetic acid. The percentages are figured on a weight basis. The pulp may be further purified, if desired, by a combination of alkali, chlorination and hypochlorite bleaching treatments. When pulp is prepared similarly with 70% acetic acid without the addition of phosphoric acid the yield of pulp is 45.7% and the pulp contains 1.64% of lignin and 5.1% of combined acetic acid.

Example II 100 parts by weight of white birch chips are treated with 800 parts of 70% aqueous acetic acid in a digester system arranged for indirect heating and continuous circulation of the cooking acid, and digested at 160° C. with a series of two rapid changes of acid, holding each change in contact with the wood for five minutes at 160° C. followed by digestion with 30% aqueous acetic acid in a similar series of three rapid changes allowing the acid to remain in contact with the wood for five minutes each time at 160° C. The digested wood pulp is then removed from the digester and washed. A yield of 56.0% of wood pulp is obtained based on the weight of the wood originally employed. The wood pulp contains 6.2% of lignin and 3.8% of combined acetic acid and 15.0% of pentosans. Phosphoric acid, 0.5 to 1.0 part, may be added to the digestion mixture thereby increasing the yield of pulp obtained by said digestion.

The dried purified pulp prepared in accordance with the above examples may be esterified or etherified by processes well-known in the art and cellulose derivatives of very desirable characteristics may be obtained. Examples of cellulose derivatives which may be prepared from the improved wood pulp obtained in accordance with our invention are cellulose esters, such as, for example, cellulose acetate, cellulose nitrate, cellulose propionate, and cellulose butyrate, mixed esters, such as cellulose acetate-propionate and cellulose acetate-butyrate, and cellulose ethers, such as ethyl cellulose and benzyl cellulose. The pulp may also be used advantageously for the preparation of regenerated cellulose foils, yarn and filaments by the viscose or cuprammonium processes.

It is to be understood that the foregoing detailed description is given merely by way of illustration and that many variations may be made therein without departing from the spirit of our invention.

Having described our invention, what we desire to secure by Letters Patent is:

1. Process for the preparation of purified wood pulp cellulose, which comprises digesting wood for 5 to 60 minutes at 150 to 160° C. with a 50 to 70% by weight aqueous solution of a lower aliphatic acid selected from the group consisting of acetic, propionic and butyric acid, recovering the digested material and subjecting the same to at least one additional digestion for 5 to 60 minutes at 150 to 160° C. with a 30 to 40% by weight aqueous solution of a lower aliphatic acid selected from the group consisting of acetic, propionic and butyric acid.

2. Process for the preparation of purified wood pulp cellulose, which comprises digesting wood for 5 to 60 minutes at 150 to 160° C. with a 50 to 70% by weight aqueous solution of a lower aliphatic acid selected from the group consisting of acetic, propionic and butyric acid containing 0.5 to 1.0% by weight of phosphoric acid, recovering the digested material and subjecting the same to at least one additional digestion for 5 to 60 minutes at 150 to 160° C. with a 30 to 40% by weight aqueous solution of a lower aliphatic acid selected from the group consisting of acetic, propionic and butyric acid and containing 0.5 to 1.0% by weight of phosphoric acid.

3. Process for the preparation of purified wood pulp cellulose, which comprises digesting wood for 5 to 60 minutes at 150 to 160° C. with a 50 to 70% by weight aqueous solution of acetic acid, recovering the digested material and subjecting the same to at least one additional digestion for 5 to 60 minutes at 150 to 160° C. with a 30 to 40% by weight aqueous solution of acetic acid.

4. Process for the preparation of purified wood pulp cellulose, which comprises digesting wood for 5 to 60 minutes at 150 to 160° C. with a 50 to 70% by weight aqueous solution of acetic acid containing 0.5 to 1.0% by weight on the wood of phosphoric acid, recovering the digested material and subjecting the same to at least one additional digestion for 5 to 60 minutes at 150 to 160° C. with a 30 to 40% by weight aqueous solution of acetic acid containing 0.5 to 1.0% by weight on the wood of phosphoric acid.

5. Process for the preparation of purified wood pulp cellulose, which comprises digesting wood for 5 to 60 minutes at 150 to 160° C. with 6 to 8 parts by weight on the weight of the wood of a 50 to 70% by weight aqueous solution of acetic acid containing 0.5 to 1.0% by weight on the wood of phosphoric acid, recovering the digested material and subjecting the same to at least one additional digestion for 5 to 60 minutes at 150 to 160° C. with 6 to 8 parts by weight on the weight of the wood of a 30 to 40% by weight aqueous solution of acetic acid containing 0.5 to 1.0% by weight on the wood of phosphoric acid.

MERVIN E. MARTIN.
DANIEL L. SHERK.

REFERENCES CITED

The following references are of record in the file of this patent:

UNITED STATES PATENTS

| Number | Name | Date |
|---|---|---|
| 1,038,730 | Dorner | Sept. 17, 1912 |
| 1,923,292 | Bassett | Aug. 22, 1933 |
| 2,070,585 | Dreyfus | Feb. 16, 1937 |

FOREIGN PATENTS

| Number | Country | Date |
|---|---|---|
| 45,010 | Sweden | June 5, 1918 |

OTHER REFERENCES

Chemical Abstracts, vol. 35 pp. 6448 and 6449 (1941).

Chemical Abstracts, vol. 38 p. 6092 (1944).

Paper Industry and Paper World, Aug. 1943, p. 558.

Paper Industry and Paper World, Nov. 1943, p. 926.